June 9, 1953  G. C. LAWSON  2,641,145
REDUCTION DRIVE USEFUL FOR VENETIAN BLINDS
Filed June 7, 1947  3 Sheets-Sheet 1

INVENTOR.
GOTTFRID C. LAWSON
BY
J. D. Douglas

June 9, 1953  G. C. LAWSON  2,641,145
REDUCTION DRIVE USEFUL FOR VENETIAN BLINDS
Filed June 7, 1947  3 Sheets-Sheet 2

INVENTOR.
GOTTFRID C. LAWSON
BY J. D. Douglass

June 9, 1953  G. C. LAWSON  2,641,145
REDUCTION DRIVE USEFUL FOR VENETIAN BLINDS
Filed June 7, 1947  3 Sheets-Sheet 3

INVENTOR.
GOTTFRID C. LAWSON
BY J. D. Douglass

Patented June 9, 1953

2,641,145

UNITED STATES PATENT OFFICE 2,641,145

REDUCTION DRIVE USEFUL FOR VENETIAN BLINDS

Gottfrid C. Lawson, Cleveland, Ohio

Application June 7, 1947, Serial No. 753,216

2 Claims. (Cl. 74—804)

This invention relates to reduction drives, and more particularly to a drive useful for a Venetian blind for effecting the tilting of the slats of the blind. Although the invention about to be described is described in conjunction with use on Venetian blinds, it will be appreciated that its usefulness is not limited thereto.

An advantage of the invention is to provide a smooth reduction drive which enables a blind to be tilted easily and accurately with a minimum amount of effort.

The operation of the tilt member 25 is effected by pulling a cord which is trained around a pulley or drum and which drum operates through a gear reduction to rotate the rod.

Figure 4:
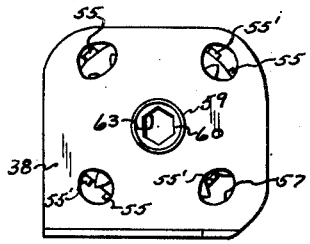
Fig. 4 is a view taken from a plane indicated by the line 8—8 of Fig. 3.

A shaft 33 is provided for the drum at the axis thereof, one end adapted to be rotatably journalled in and supported by an angle bracket 35, Fig. 4, the upstanding arm 36 of which carries the bearing 37. The other end of the shaft is journalled in the rod 29 which, in turn, is carried by a driven gear and the driven gear journalled in the bracket 38, as will hereinafter more clearly appear.

Figure 6:
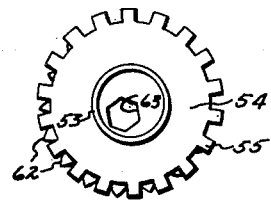
Fig. 6 is a view from the opposite side.
Figure 7:
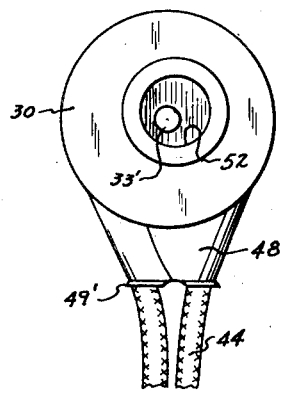
Fig. 7 is a view taken from a plane indicated by the line 8—8 of Fig. 3.
Figure 8:
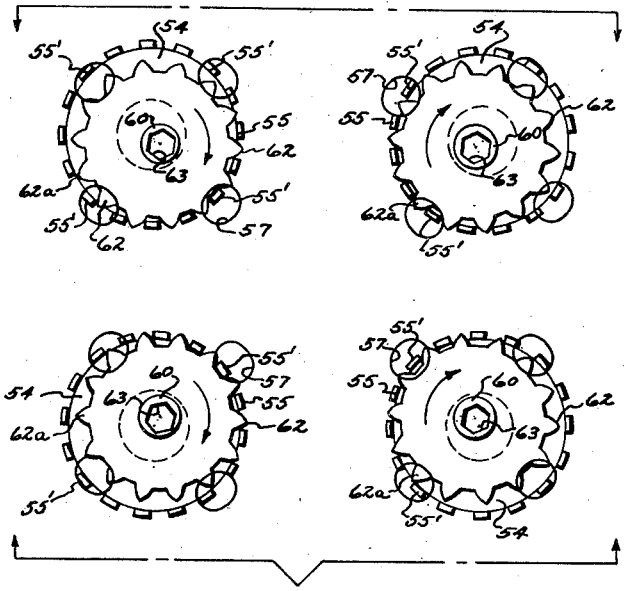
Fig. 8 is a progressive diagrammatic view showing the position taken by the driving and driven members during certain increments of rotation.

As previously stated, a bearing bracket supports one end of the drum. The other end of the drum, as can best be seen in Fig. 8 is provided with an eccentrically disposed bearing journal 52, adapted to receive and support therein a boss 53 of a drive gear or member 54. This gear, as can best be seen in Figs. 4, 6 and 7 includes a body which carries the boss 53, and the periphery is provided with a plurality of spaced teeth 55 which extend from the body parallel to the axis. In this instance, there are 16 teeth, although the number may vary between wide limits.

The gear 54, being journalled by the boss 53 in the journal 52, upon rotation of the drum is moved in an eccentric orbit. It is prevented from turning, however, by engagement in guide holes of the gear bracket 38. To this end, four of the teeth 55' at equal intervals from each other are extended and project into apertures 57 of the bracket 38. The manner in which the teeth 55' are guided in their eccentric movement by the walls of the apertures 57 is clearly disclosed in Fig. 9.

The bracket 38, Fig. 4, is provided with a bearing boss 59 in which is rotatably disposed the hub 60 of a driven gear 61. The gear 61 is provided with teeth 62 on its periphery, in this instance there being 14 teeth. The base diameter of the gear at the root of the teeth is of less diameter than the gear 54 by the amount of eccentricity of the journal 52, and the diameter of the driving and driven gears are so proportioned that some of the teeth of the gear 61 engage between some of the teeth of gear 54 so that as the gear 54 moves about its eccentric orbit, the gear 61 is rotated at a reduced speed. The speed obviously depends on the ratio of the gears. In this instance, seven revolutions of the drive gear causes one revolution of the driven gear, and the ratio is therefore 7:1.

Figure 5:
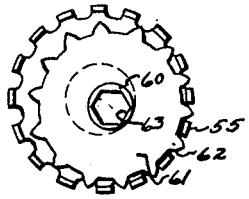
Fig. 5 is an elevational view of the driving and driven members in cooperative relation with each other but removed from their association with other parts.

The hub 60 of the gear 61, Fig. 5, is provided with a hexagonal opening 63 into which the rod 29 extends to provide a driving engagement therebetween. The end of the shaft 29 which extends into the hub 60 is provided with a bore 65, Fig. 4, into which the drum shaft 33 extends and is journalled.

Therefore, the hub 60 of the gear 61 is rotatably supported by the bearing boss 59 on the bracket 38. The shaft or rod 28 is then supported by the hub 60. The journal 65 in the rod in turn supports the end 33' of the shaft 33 and thus supports the one end of the drum, the other end of the drum being supported by the bearing 37 in the bracket 35 and, finally, the bearing 52 on the drum supports the drive members 54.

To summarize the operation, the drum is rotated by pulling on one of the cords. The eccentric bearing 52 on the drum drives the driven gear in an eccentric orbit. It is guided in this orbit by the egagement of the teeth 55' in the guide openings 57 in the bracket 38. The teeth 55 and 55' on the drive gear engage with the teeth 62 on the driven gear, camming or prying the driven gear 61 around its axis. This motion is at a reduced ratio of 7:1 and is transmitted to the rod 29 which carries the tilt member 25. As the member 25 is rotated, one side of the ladder tape is pulled up, and the other lowered to open or close the slats.

Figure 9:
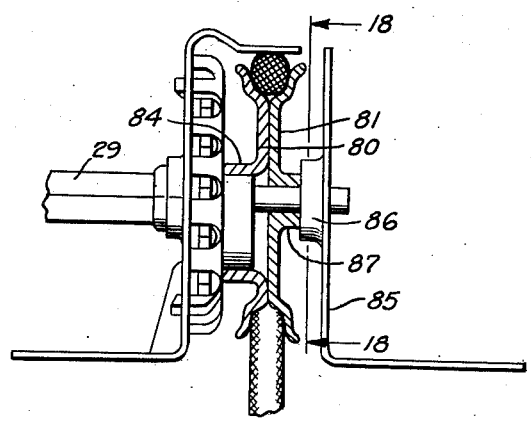
Fig. 9 is a side elevational view of the driving mechanism showing in section a modified form of cord driving means.

The manner in which the driving and driven gears cooperate is shown clearly in Fig. 9. It will be noted that in the lower right hand figure, the drive member is disposed so that the eccentric has moved it to the lower right hand quadrant, and the two gears are in engagement in the upper left hand quadrant. It being assumed that the teeth 55' are being moved in a counterclockwise orbit, it will be noted in the lower left hand quadrant the tooth 55' is about to engage the driven gear tooth 62a. In the next view, the upper right hand figure, it will be observed, the eccentric having rotated 90 degrees, the tooth 55' has moved to the root of the tooth 62a causing the gear 61 to be rotated in a clockwise direction. In the upper left hand view, which represents another 90 degrees rotation of the drive member, it will be seen that the tooth 62a is moved beyond contact with the tooth 55'; and in the last figure (the lower left hand), it can be seen how the tooth 62a has moved still farther.

This engagement is not peculiar to the tooth 62a but is common to all of the teeth. In other words, the driven gear may be said to roll around the teeth of the drive gear.

Of particular interest is the fact that although drive from the driving to the driven member is smooth and effective, the driven member cannot move the driving member in a reverse direction because the driven member cannot itself revolve but only moves in an eccentric path, and it is prevented from moving further by its eccentric engagement with the drum. This is particularly effective in the case where the drive is used as a Venetian blind control, since it enables the slats to be adjusted to any position between open and closed and they will stay in that adjusted position.

Although the 7:1 ratio is a convenient one to use in a device of this character disclosed, it will be appreciated that other ratios may be used and in some instances desirable.

It will also be noted that the same bolts which hold the cord lock 21 in place may hold the bracket 38, thus enabling a compact assembly to be made and allowing the cords to all be placed on the same side of the window.

Figure 10:
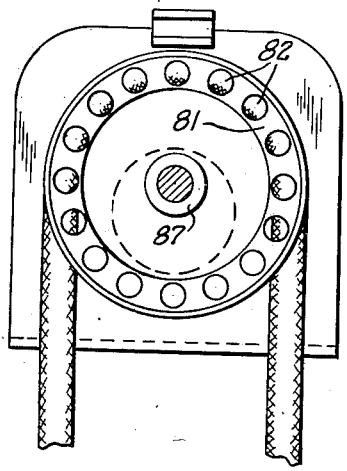
Fig. 10 is a view taken from a plane indicated by the line 18—18 of Fig. 9.
Figure 1:
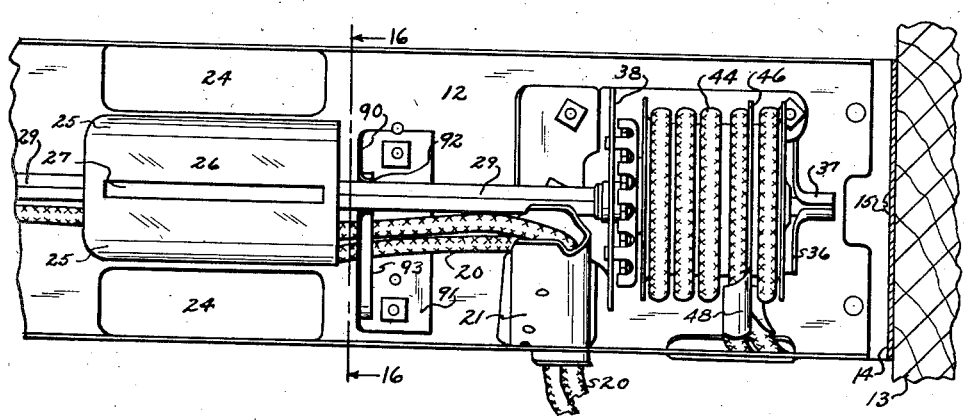
Fig. 1 is a top plan view of the housing and the internal mechanism.
Figure 2:
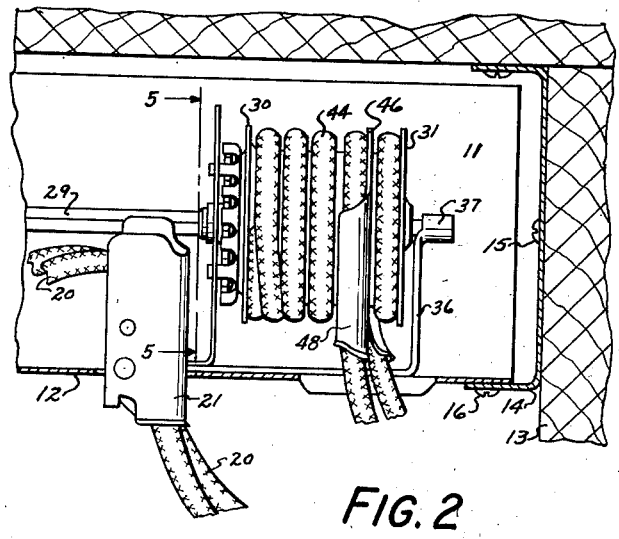
Fig. 2 is an elevational view of the mechanism, the front wall of the housing being broken away.
Figure 3:
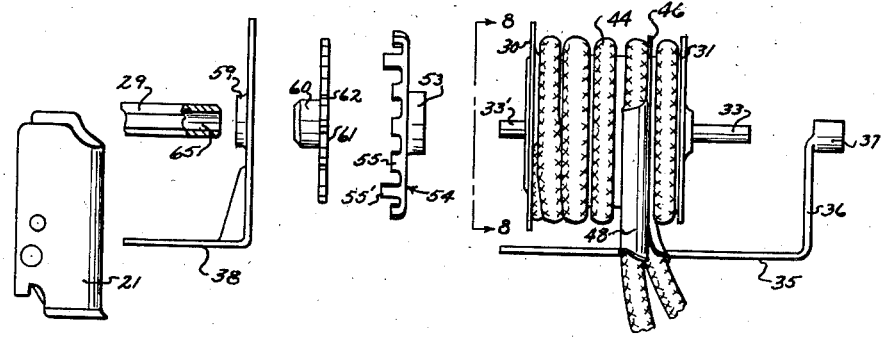
Fig. 3 is an exploded view of the mechanism removed from the housing.

Figs. 9 and 10 show a modified form of the invention. In this instance, the drum is replaced by a sheave which is stamped from two parts 80 and 81 subsequently held together by spot welding. The flanged periphery of the sheave is provided with holes 82 which form a gripping surface for the cord 44. The part 81 is provided with a hub 87 which is journalled in the bearing 86 of the bracket 85, and the part 81 is provided with the eccentric bearing 84 which corresponds to 52 of the drum and is adapted to receive the boss 53 of the drive member. The operation is substantially the same as for the other embodiment except that the cord is trained over the sheave which replaces the drum.

Having thus described my invention, I am aware that numerous and extensive departures may be made therefrom without departing from the spirit or scope of my invention.

I claim:

1. A reduction drive including a driving member, means for moving said driving member in an eccentric path, means for holding said driving member against rotation and guiding it in its eccentric path, said driving member having spaced teeth on its periphery extending parallel to its axis, some of said teeth being extended and disposed in engagement with said guiding means, a driven member having radial teeth for engagement with those of the driving member and being of a less diameter than the driving member by an amount equal to the eccentricity of the orbit of the driving member.

2. A speed reduction drive comprising a bracket, a driven shaft, a toothed wheel having radial teeth and fixed to said shaft, said shaft and gear assembly being journalled in said bracket and formed with a bearing therein, crown gear means having axially extending teeth surrounding said toothed wheel, said axially extending teeth being engaged with said radially extending teeth over a part of the periphery of said wheel, said bracket being formed to provide a plurality of orbit shaped openings therein, a plurality of said axially extending teeth being elongated, each of said elongated teeth being engaged in one of said orbit shaped openings whereby the orbit of said gear means is strictly defined, and drive means having a shaft journalled in said bearing and eccentric means in driving engagement with said crown gear means to drive said gear means in its orbit.

GOTTFRID C. LAWSON.

References Cited in the file of this patent

UNITED STATES PATENTS

| Number | Name | Date |
|---|---|---|
| 64,915 | Shaw | May 21, 1867 |
| 292,974 | Yeomans | Feb. 5, 1884 |
| 1,282,172 | Beirns | Oct. 22, 1918 |
| 1,604,192 | Parker | Oct. 26, 1926 |
| 1,627,697 | Fredericks | May 10, 1927 |
| 1,648,491 | McAllister | Nov. 8, 1927 |
| 1,913,508 | Phillips | June 13, 1933 |
| 2,157,776 | Steinkamp | May 9, 1939 |
| 2,223,633 | McKerlie | Dec. 6, 1940 |
| 2,262,949 | Lorentzen | Nov. 18, 1941 |
| 2,304,934 | Lawson | Dec. 15, 1942 |
| 2,334,132 | Sherwood | Nov. 9, 1943 |
| 2,495,811 | Hollmann | Jan. 31, 1950 |

FOREIGN PATENTS

| Number | Country | Date |
|---|---|---|
| 10,359 | Germany | July 14, 1880 |
| 19,254 | Australia | Dec. 12, 1935 |
| 102,821 | France | Mar. 30, 1874 |
| 498,330 | Great Britain | Jan. 6, 1939 |
| 596,207 | France | Aug. 1, 1925 |